(12) United States Patent
Yoneyama

(10) Patent No.: US 6,522,453 B2
(45) Date of Patent: Feb. 18, 2003

(54) PROJECTION DEVICE AND A PROJECTION LENS

(75) Inventor: Kazuya Yoneyama, Utsunomiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/956,041

(22) Filed: Sep. 20, 2001

(65) Prior Publication Data
US 2002/0057485 A1 May 16, 2002

(30) Foreign Application Priority Data

Sep. 28, 2000 (JP) ......................................... 2000-295743

(51) Int. Cl.$^7$ ........................... G02B 26/00; G03B 21/14
(52) U.S. Cl. ...................... 359/290; 359/291; 359/298; 359/649; 353/100; 353/101
(58) Field of Search ................................. 359/290, 291, 359/619, 621, 625, 631, 649, 650, 651, 224, 230, 298; 353/100, 101, 97, 34, 35, 48, 49; 348/771, 742

(56) References Cited

U.S. PATENT DOCUMENTS 6,382,799 B1 * 5/2002 Nishikawa et al. ......... 353/122

* cited by examiner

*Primary Examiner*—Hung Xuan Dang
*Assistant Examiner*—Tuyen Tra
(74) *Attorney, Agent, or Firm*—Arnold International; Bruce Y. Arnold

(57) ABSTRACT

A projector device is disclosed which uses light that is spatially modulated by a DMD having mirrors which are moveable between Off and On positions in response to image information input to the DMD. Images formed at the DMD are projected onto a screen via a projection lens. Surfaces of the lens elements of the projection lens are designed with curvatures such that light that may be undesirably reflected back to the DMD will not be in a converged state at or near the surfaces of DMD mirrors. In this way, ghost light that is projected onto the screen is dispersed over a wider area, and thus is less noticeable and not troublesome.

9 Claims, 8 Drawing Sheets

PRIOR ART (Comparative Example)

PROJECTION DEVICE AND A PROJECTION LENS

BACKGROUND OF THE INVENTION

A projection device that uses a digital micro-mirror device (hereinafter DMD) to modulate light from a light source has the advantage of providing bright images with high resolution. A DMD is an image display device in which micro-mirrors are arranged in an array, usually a two-dimensional array, with each mirror capable of being individually switched between two orientations so that it is either Off or On with regard to reflecting light from a light source towards an output aperture. Usually, light that is to be projected is reflected towards the output aperture by a micro-mirror in its On-position, and light that is not to be projected is reflected to a light absorbing body by the micro-mirror in its Off-position. The output aperture is usually the pupil of a projection lens.

When using a DMD to input image information onto a light beam, however, a problem sometimes occurs in that undesired light (hereinafter termed "ghost light") may appear on the projection screen. More specifically, as one example, when an image is projected having a light color in the upper right area of the image field and a dark background, in some cases ghost light may appear in the lower right area of the screen. The area where the ghost light appears varies according to the structure of the device. Often, the ghost light will be incident onto the screen at an angle of about ±45° to the normal of the screen surface. It is assumed that ghost light is formed by light that is undesirably reflected by one or more surfaces of the projection lens, re-enters the DMD, and is reflected by micro-mirrors which are in the Off-position (i.e., by Off elements) in a direction which causes the reflected rays to re-enter the projection lens and be projected onto the screen.

BRIEF SUMMARY OF THE INVENTION

The present invention relates to a projection device having a projection lens for projecting fine details of an image, and that uses a DMD to modulate light from a light source with image information so as to create an image that is then projected onto a screen for observation. The object of the present invention is to prevent artifacts, caused by light which undesirably reflects from a surface of the projection lens and re-enters the DMD where it is again reflected toward the screen, from appearing on the screen in a noticeable manner.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is a projection device which projects a beam of light from a DMD, which functions as an image source, onto a screen using a projection lens. When the following Condition (1) is satisfied, one or more measures are taken so that specified light rays will not be in a converged state at the DMD:

$$\omega \leq |\theta_1| \leq 3\omega \qquad \text{Condition (1)}$$

where

ω is one-half the angular amount that individual mirrors of the DMD are rotated between the Off and On orientations when modulating light from the light source with image information, and $\theta_1$ is an angle within the range of angles that the light rays which transit back to the DMD, after being undesirably reflected by a lens element surface of the projection lens, make with the optical axis X of the DMD.

The specified light rays for which one or more measures are taken to ensure that the rays are not in a "converged state" at the DMD are those light rays from a primary light source which are reflected by the DMD to the projection lens and are then undesirably reflected by one or more surfaces of the projection lens back to the DMD. If these light rays are not in a "converged state", meaning these rays are not converged at or near the mirror surfaces of the DMD, they will be less apparent to viewers even if projected by the projection lens onto the screen because they will be more widely distributed over the screen surface and thus barely noticeable, if noticeable at all. The absolute value sign occurs in Condition (1) because light rays that have been unintentionally reflected by a surface of the projection lens back to the DMD will be oriented with respect to the optical axis in opposite directions (i.e., towards versus away from the optical axis) as compared to the light rays from the primary light source as they are first directed towards the DMD.

The surfaces of the projection lens which can undesirably reflect light rays back to the DMD so as to become ghost light can be any planar surface and certain ones of the curved lens element surfaces of the projection lens.

An explanation of the operation of the present invention will now be given, with reference to the drawings.

Figure 1:
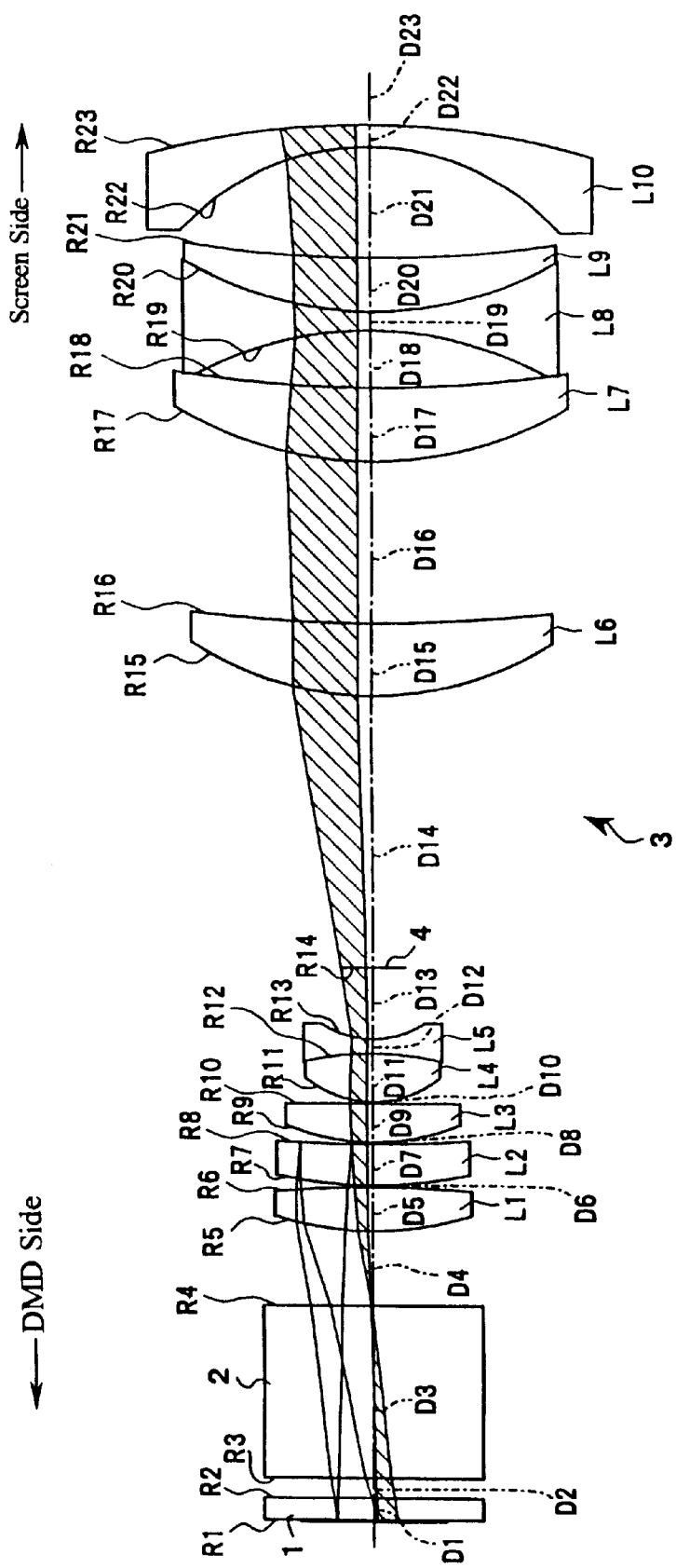
FIG. 1 shows the optical components of a projector that relates to the present invention.

FIG. 1 illustrates a major portion of a projection device according to the present invention. Light from a primary light source (not illustrated) is incident onto a DMD 1, which serves as an image source to direct light that has been reflected by those elements of the DMD 1 which are in the On-position to a projection lens 3 (formed of lens elements L1–L10) via a total internal reflection prism 2 (hereinafter TIR prism 2). A stop 4 is positioned between lens element L5 and lens element L6 of the projection lens 3. As will be described later, the construction illustrated in FIG. 1 reduces the amount of ghost light that appears on a screen (not illustrated). The screen is positioned to the right of the components which are illustrated in FIG. 1. Image information that is fed to the DMD 1 is used to switch selected micro-mirror elements of the DMD 1 from an Off-position to an On-position so as to form an image source. The DMD is positioned at a conjugate position of the projection lens 3 and the screen is positioned at the other conjugate position so as to form enlarged images for viewing on the screen. The region near the mirror surfaces of the DMD extends from the micro-mirrors up to, and including, the screen-side surface of TIR prism 2.

Micro-mirrors in the DMD 1 are aligned in either the On-position, wherein light from a primary light source (not illustrated) is reflected toward the projection lens 3, or the Off-position, wherein light from the primary light source is reflected toward an absorbing body (not illustrated). The cross-hatched area in FIG. 1 illustrates the ray path region of Embodiment 1 which contributes to ghost light on the screen.

Figure 2:
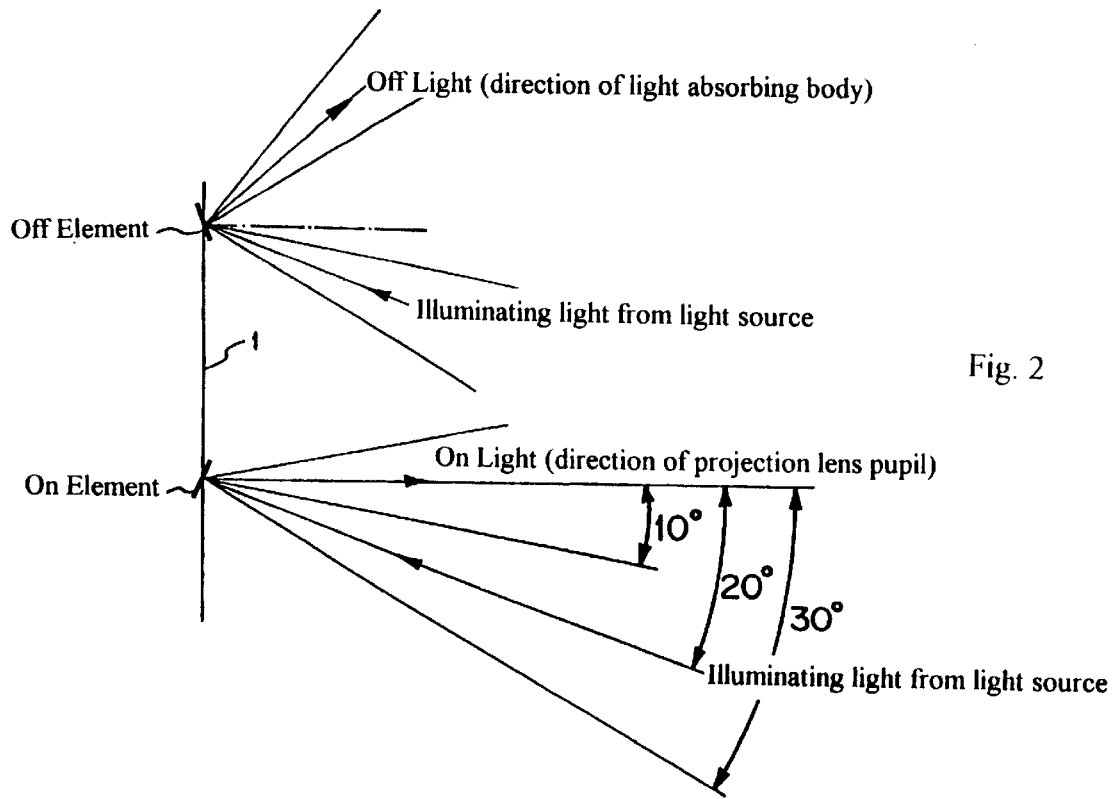
FIG. 2 illustrates light being reflected by micro-mirrors of a DMD, with the uppermost micro-mirror illustrated being oriented so as to be an Off Element.

In FIG. 2, light rays from a primary light source (not illustrated) are shown reflecting from an Off Element and an On Element. As is apparent from the light rays illustrated, the light from the illuminating light source has been condensed so as to form rays that are converged at the Off and On elements of the DMD array. In the case of an On Element, such an element is aligned at an angle such that illuminating light from a light source reflects in the direction of a pupil of the projection lens 3. In the case of an Off Element, such an element is aligned at an angle so that illuminating light from a light source reflects in the direction of a light absorbing body (not illustrated). Preferably, for an On Element, the angle between a center ray of an illuminating light beam which is incident onto the On Element and a center ray of the beam of light that is reflected by the On-Element should be about 20°. However, another angle, such as 24°, may be used. In FIG. 2, for ease of illustration, only two elements are shown.

Figure 3:
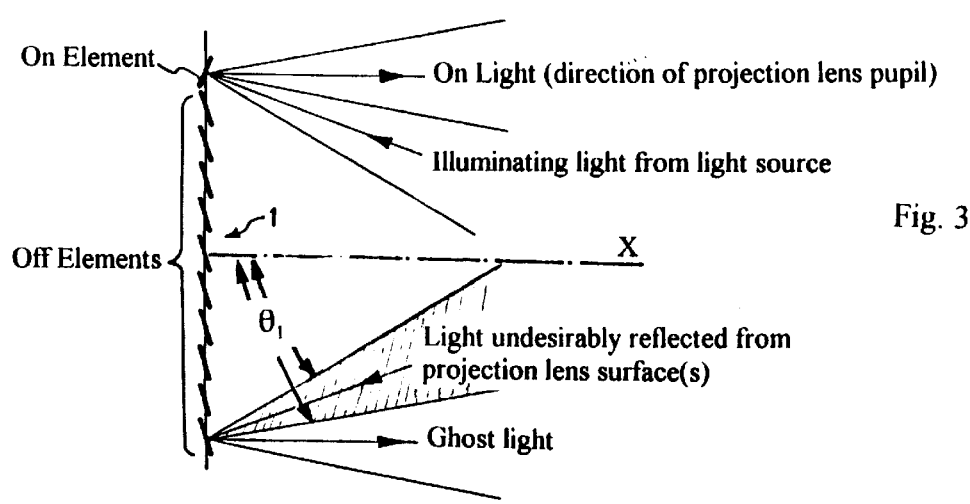
FIG. 3 illustrates light being reflected by micro-mirrors of a DMD, with the uppermost micro-mirror illustrated being oriented so as to be an On Element.

FIG. 3 illustrates light rays from an illuminating light source reflecting from an On Element, as well as light that has been undesirably reflected from one or more surfaces of the projection lens and has been returned to the DMD 1 and is then reflected from an Off Element so as to become ghost light when projected onto the screen. In other words, the lower ray paths in FIG. 3 illustrate the case where light intended to form an image on the projection screen has instead been returned to the DMD 1 by being reflected from one or more surfaces of the projection lens, and is then incident onto an Off element of DMD 1 in a converged state such that it will become ghost light that is troublesome on the screen. The range of angles that delimit the angle $\theta_1$ is illustrated by the cross-hatched region shown in FIG. 3.

Figure 4:
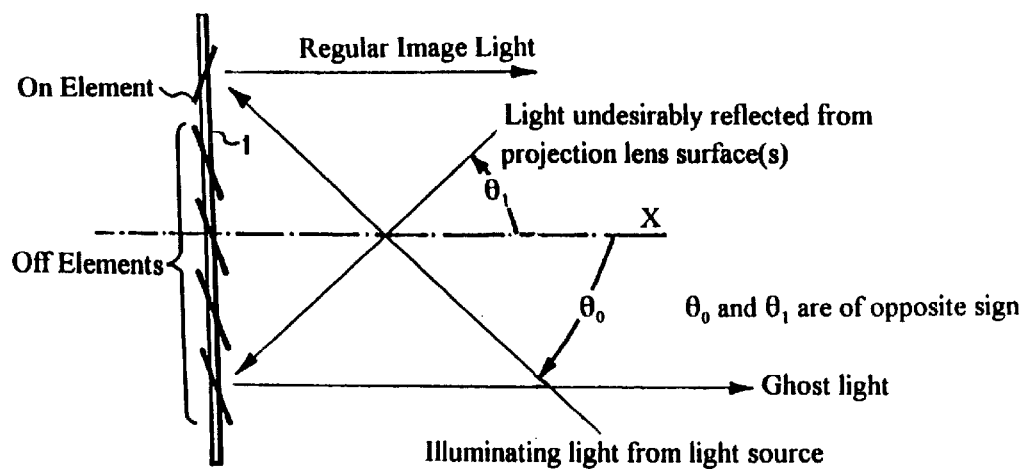
FIG. 4 illustrates how ghost light is generated by a DMD.

FIG. 4 is very similar to FIG. 3 and thus will not be separately described, except to note that the On Light of FIG. 3 is the light that contributes to the regular image light on the screen. Thus, in FIG. 4 this light has been labeled as "Regular Image Light". In other words, the ray paths incident onto the lower Off Elements of FIGS. 3 and 4 illustrate the case where light that was to form an image on the projection screen has instead been returned to the DMD 1 by being reflected from one or more surfaces of the projection lens, and is then incident onto an Off element of DMD 1 as a converged beam. Because the rays in this beam are inclined to the optical axis X of the DMD 1 within a range as specified in Condition (1), this light will become ghost light on the screen.

When a beam of light is incident onto an Off Element with light rays that are inclined to the optical axis X of the DMD 1 within a range as specified in Condition (1), but of the same sign as that of the illuminating light beam from the light source, no problem occurs since this light will be reflected by the Off Element in directions which will not enable it to enter the pupil of projection lens 3. However, when a beam of light is incident onto an Off element with about the same range of angles to the optical axis X as delimit $\theta_1$ (see cross-hatched region of FIG. 3) and of opposite sign as that of the illuminating light beam $\theta_0$ (see FIG. 4) from the light source, it reflects in directions of the pupil of projection lens 3, just as does light for a normal image that is reflected by On Elements, and thus reaches the screen. If this beam of light is in a state of being converged as it reflects from Off Elements, the intensity on the screen will be enhanced and ghost light on the screen will become noticeable.

Figure 5:
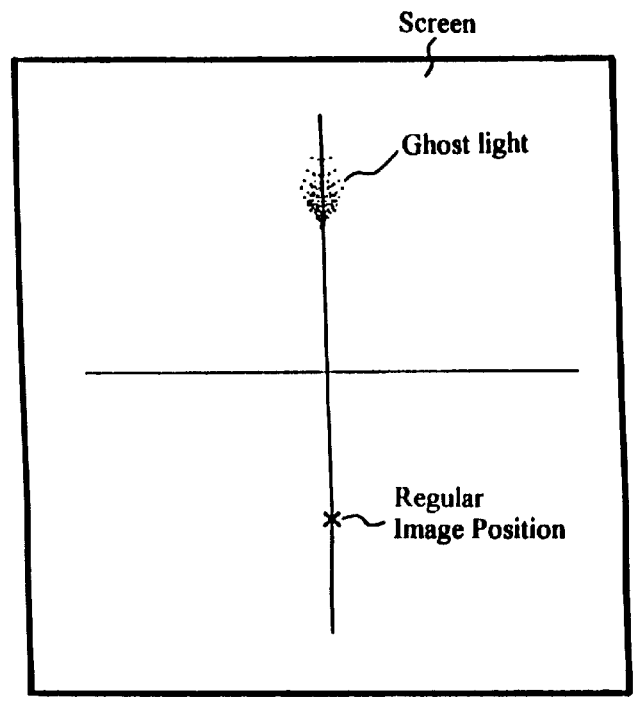
FIG. 5 illustrates one example of how ghost light may appear on a screen.

FIG. 5 illustrates ghost light on the screen as well as the regular image position of light rays which, rather than being undesirably reflected by one or more surfaces of the projection lens back to the DMD 1, was transmitted by the projection lens so as to form a regular image on the screen. If the regular image position on the screen occupies all quadrants of the screen, the ghost light will likewise occupy all quadrants of the screen. The ghost light in this case is rather noticeable because the light rays are converged to the optical axis X ed at the screen surface. Because the DMD surface and the screen position are conjugate positions of the projection lens, light rays that are undesirably reflected from a projection lens surface so as to be converged at the mirror surfaces of the DMD 1, will also be converged at the screen.

Figure 6A:
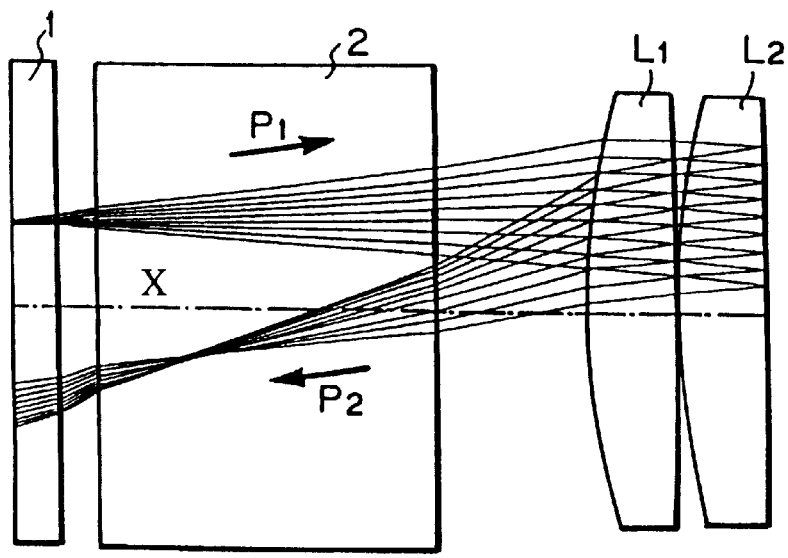
FIGS. 6A and 6B illustrate how light that should form a projected image at a screen may be unintentionally reflected by a surface of the projection lens so as to re-enter the DMD, be reflected once more, and become ghost light as a result of passing through a stop (i.e., a diaphragm) 4 before being incident onto a projection screen (not illustrated)

FIG. 6A illustrates light rays being undesirably reflected from the screen-side surface of lens element $L_2$ back to the DMD 1 where these rays are again reflected towards the projection lens and screen. Light rays $P_1$ are first reflected by an On Element of the DMD 1 and enter the lens elements $L_1$, $L_2$ of the projection lens. A surface on the screen side of lens element $L_2$ undesirably reflects a portion of these rays $P_2$ back to the DMD 1. The angles these rays make to the optical axis X of the DMD 1 as they are incident onto the mirror surfaces are in the range of 10°–27°. The light reflected by the screen-side surface of lens element $L_2$ is shown in FIG. 6A as being converged (i.e., has a beam waist) within the prism 2 and thus does form ghost light that is noticeable on the screen.

Figure 6B:
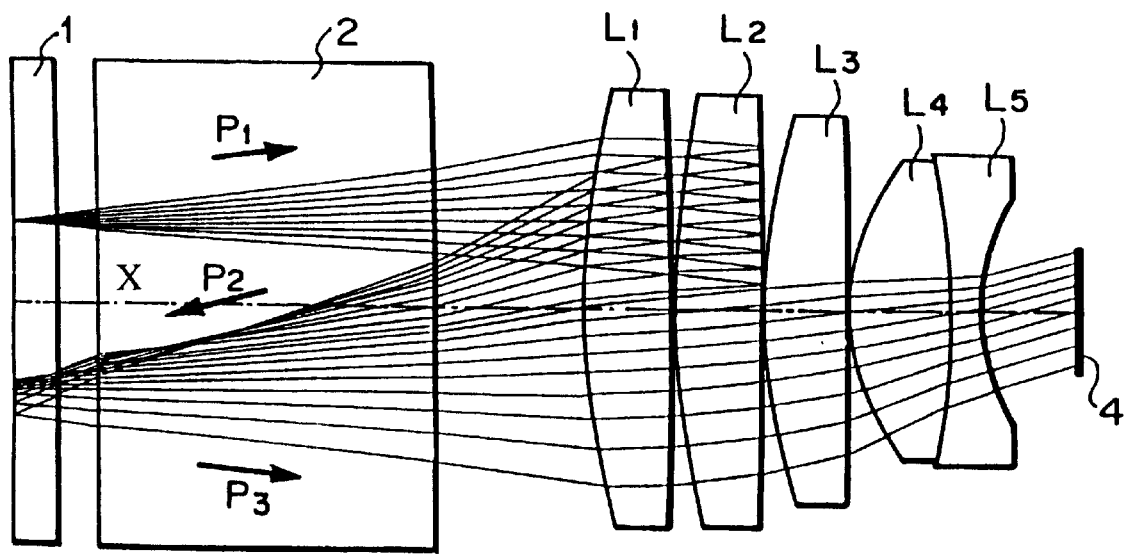

FIG. 6B is similar to FIG. 6A, but illustrates additional parts of the projection lens, which, for clarity, were omitted from FIG. 6A. In FIG. 6B, however, the screen-side surface of lens element $L_2$ of the projection lens has not been designed according to the present invention. This is apparent from the fact that the light $P_2$ that is undesirably reflected back to the DMD 1 is converged as it is incident onto the mirror surfaces of the DMD array. The reflected light $P_3$ is directed by the Off mirrors of the DMD 1 in the direction of the pupil of the projection lens 3, passes through stop 4 and will be incident onto the screen as the ghost light shown in FIG. 5. When reflected light from the lens surface re-enters DMD 1, the absolute values of the angles this light makes with the optical axis X of the DMD 1 (as illustrated in FIG. 3) are in almost the same range as the angles the illuminating light from the illuminating light source makes with the optical axis X of the regular image light of the DMD 1.

Figure 6C:
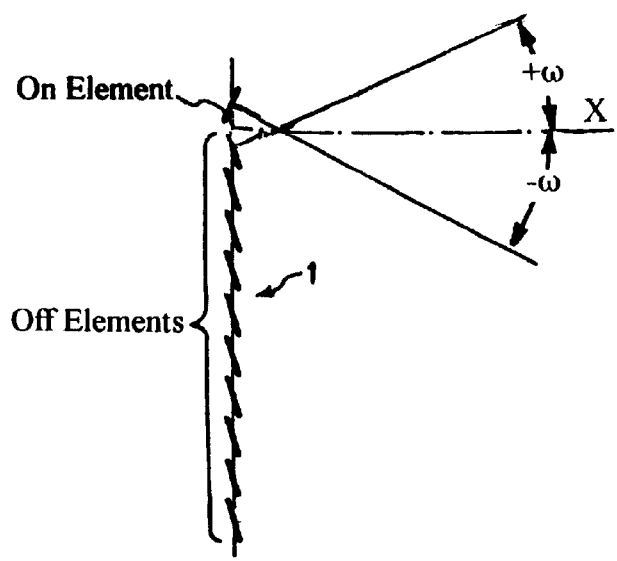
FIG. 6C illustrates the angle ω that individual mirrors of the DMD are rotated between the Off versus On orientations.

Referring to FIGS. 3 and 6C, assuming ω is one-half the angle of rotation of the mirrors of the DMD 1 between the On position and the Off position, and $\theta_1$ is as defined above, the absolute value of the angle $\theta_1$ is in the range of "not less than ω" to "not greater than 3ω". As noted above, the light that is undesirably reflected by one or more surfaces of the projection lens 3 has an opposite sign (due to its opposite orientation with respect to the angle that it makes with the optical axis X of the DMD 1) as compared to the light which originally illuminates the DMD 1 from the light source. When such a beam of light re-entering DMD 1 is in a state of not being converged at or near the mirrors of the DMD 1, it also will be in a state of not being converged on the screen, since the DMD 1 and the screen are at conjugate positions of the projection lens 3. Thus, if such ghost light reaches the screen, the intensity of the ghost light is rather weak since it will be dispersed over a larger area of the screen. This results in the ghost light being indistinct and unrecognizable.

Figure 7A:
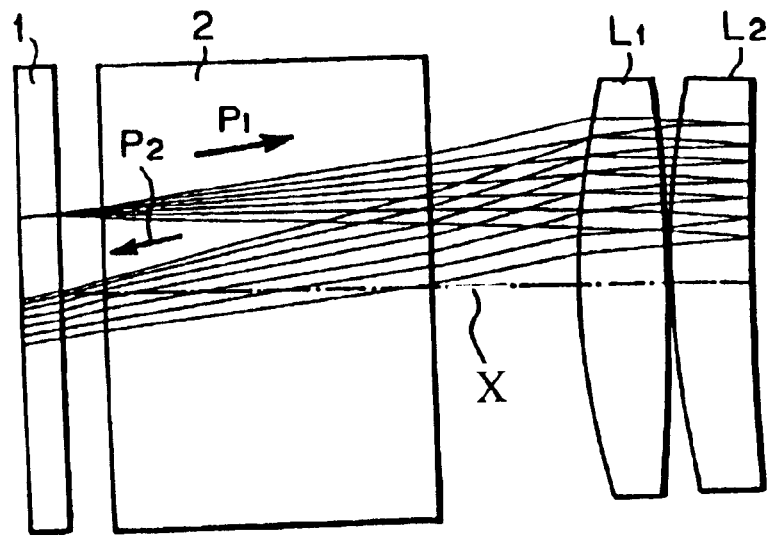
FIGS. 7A and 7B illustrate light rays of light exiting the DMD which is undesirably reflected by a surface of the projection lens so as to re-enter the DMD and be reflected to the projector lens as ghost light in the embodiment of the present invention, wherein the ghost light is ameliorated on the screen.
Figure 7B:
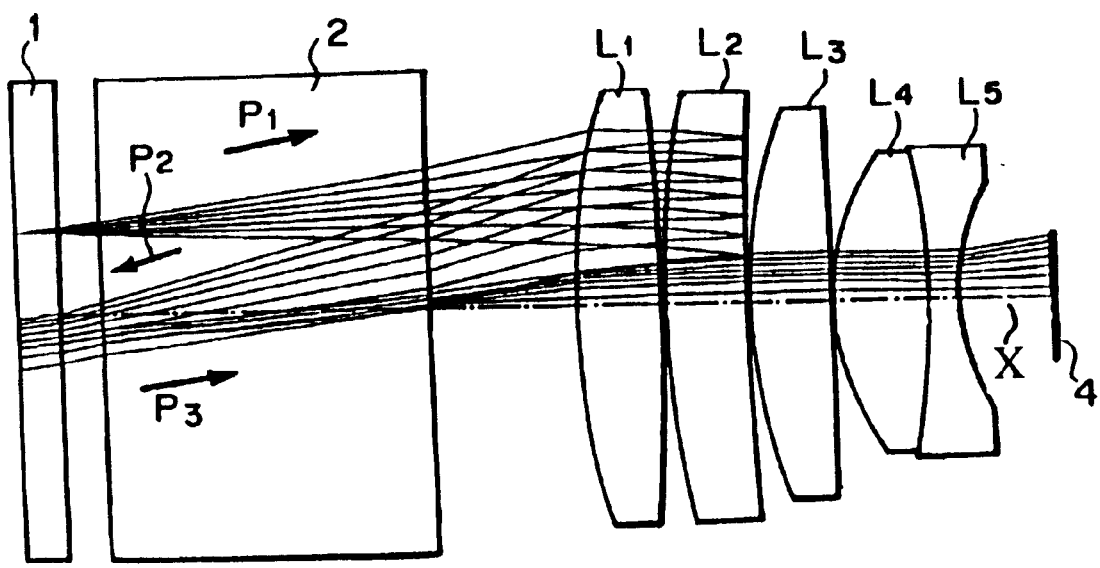

As shown in FIG. 7A, a portion of the normal image light $P_1$ (created by a primary light source, not illustrated) reflects from an On Element of the DMD 1 and is undesirably reflected by one or more surfaces of the projection lens 3, such as the surface on the screen side of the second lens $L_2$. The backward reflected light $P_2$ re-enters DMD1. However, as illustrated in FIG. 7B, the convergence position of the light (i.e., the beam waist) is no longer positioned substantially at the mirror surfaces. Instead, the convergence position is remote from the surfaces of the mirrors of the DMD 1, and in this case occurs in the light $P_3$ near the screen side surface of prism 2. At a minimum, the convergence position is more remote from the mirror surfaces of the DMD than the distance the surface of radius R2 is from the surface of radius R1, as illustrated in FIG. 1. In other words, the beam waist is outside the position where the light re-enters the DMD 1. The reflected light $P_2$ includes light rays that make angles with the optical axis X from 10° to 18°.

As shown in FIG. 7B, the light $P_3$, which is light from the incident beam $P_2$ that has been reflected by one or more OFF elements, is reflected in the direction of the pupil of the projection lens 3 and is irradiated onto the screen after passing through the stop 4.

Figure 8:
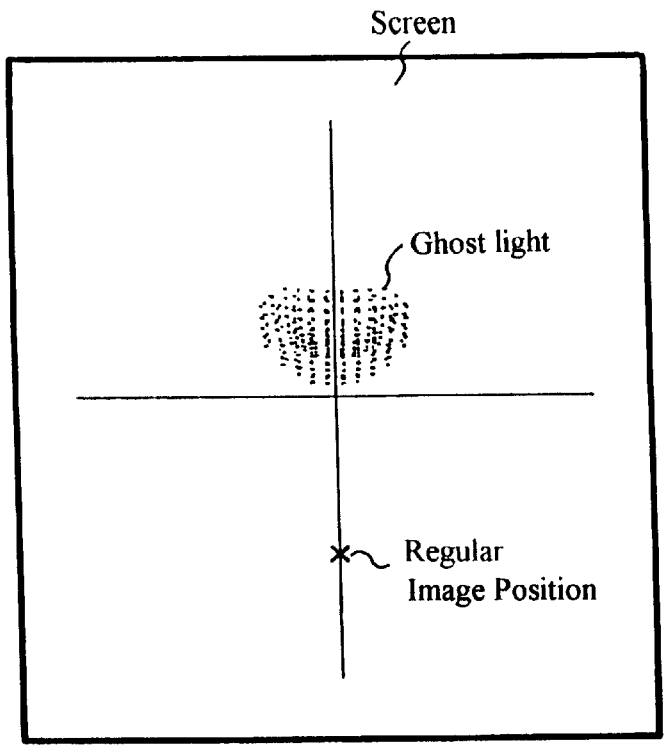
FIG. 8 is a schematic diagram illustrating how ghost light on the screen is ameliorated by the present invention.

As shown in FIG. 8, since the light is not in a converged state as it is re-incident onto DMD 1, the ghost light that is projected by the projection lens 3 onto the screen will not be as intense as in the situation shown in FIG. 5. This is due to the light being dispersed over a larger area of the screen Thus, the existence of ghost light will not be as troublesome and may not even be apparent to the viewer.

As shown above, in this embodiment, changing the shape of certain curved surfaces of the projection lens 3 varies the state of convergence of the reflected light $P_2$ as it is again reflected by DMD1. According to the present invention, the shape of each curved surface of the projection lens 3 on the DMD side of the stop 4 is designed so that light that is undesirably reflected by one or more of these lens element surfaces will not be in a "converged state" as it is again reflected by the mirror elements of the DMD 1. Light is in a "converged state" as it reflects again from the DMD 1 if the beam waist of the light rays is substantially at the surfaces of the micro-mirrors of the DMD 1.

In Embodiment 1 (to be described in detail later), if the angle of the light ray in the reflection light $P_2$ that is most inclined to the optical axis X is 18° as it enters the DMD 1, and one-half the angle of deviation 2ω between the On and Off positions of the mirrors of the DMD 1 is 10°, the angle $\theta_1$ can be designated as equal to 1.8ω.

In general, in a projection device using a DMD, ghost light on the screen which is troublesome is generated by a beam of light which is: (1) reflected by a lens element surface of the projection lens 3 on the DMD side of the stop 4; and (2) makes an angle $\theta_1$ with the optical axis X of not less than ω and not greater than 3ω as it transits back to the DMD 1, where ω is the angle of deviation of the mirrors of the DMD between the On and Off positions. Therefore, any technique for keeping undesirably reflected light that is returned to the DMD 1 from being converged at the DMD 1 need only be applied for a beam of light which satisfies Condition (1), mentioned above.

Figure 9:
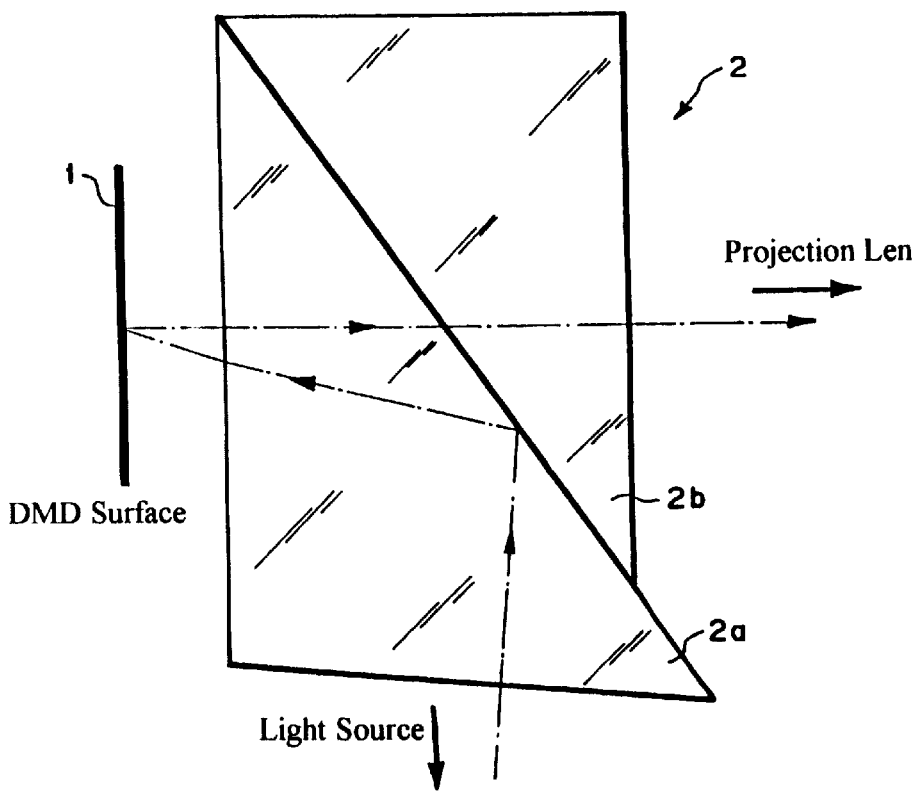
FIG. 9 is a schematic diagram which illustrates the operation of a total internal reflection TIR prism 2 as shown in FIG. 1; and, FIG. 10 illustrates the optical components of a projector according to the prior art (used in a comparative example, discussed later).

As shown in FIG. 9, a TIR prism 2 may be used to input light from the light source to the DMD 1. TIR prism 2 is composed of two triangular prisms 2a, 2b, which face each other and are separated by a fine air gap. TIR prism 2 reflects by total internal reflection the illuminating light from a light source onto the DMD 1. However, the angle of incidence of regular image light that has been reflected by On Elements of the DMD 1 is such that it will be less than Brewster's angle, and thus the normal image light is transmitted by the first triangular prism 2a, the air gap, and the second triangular prism 2b, in this order, and exits in the direction of the pupil of projection lens 3.

Figure 10:
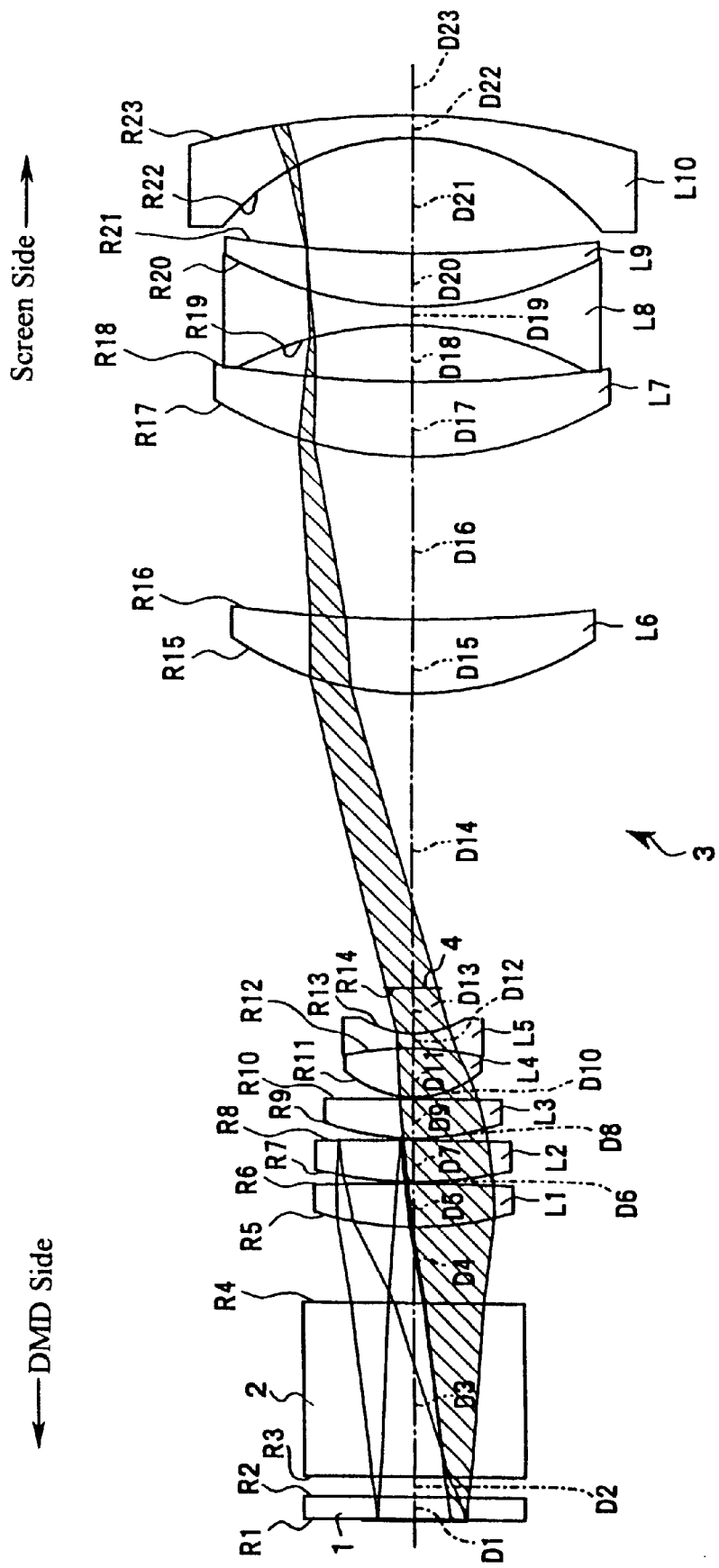

FIG. 10 illustrates, with cross-hatching, the ray path region for the Comparative Example which contributes to ghost light on the screen. As is apparent from comparing the cross-hatched region of FIG. 1 versus FIG. 10, the light rays in Embodiment 1 (FIG. 1) exit the screen-side surface of lens element L10 of the projection lens dispersed over a larger area. This results in the ghost light on the screen being dispersed over a larger area, as shown in FIG. 8. Thus, in the present invention, the occurrence of troublesome ghost light (i.e., that which is noticeable) is ameliorated as compared to that of prior art projection devices.

Embodiment 1 of the present invention, as well as a prior art projection device that is given as Comparative Example 1, will now be discussed in detail.

Embodiment 1

Table 1 below lists, for Embodiment 1, the surface number #, starting with the DMD mirror surface and ending with the screen surface, the radius of curvature R (in mm) of each surface, the on-axis surface spacing D (in mm) between surfaces, as well as the index of refraction N and the Abbe number υ of each component at a wavelength 546.1 nm.

TABLE 1

| # | R | D | N | ν |
|---|---|---|---|---|
| 1 (DMD) | ∞ | 3.00 | 1.51633 | 64.1 |
| 2 (DMD) | ∞ | 2.75 | | |
| 3 | ∞ | 23.00 | 1.51633 | 64.1 |
| 4 | ∞ | 10.43 | | |
| 5 | 46.522 | 5.87 | 1.71736 | 29.5 |
| 6 | −159.999 | 0.30 | | |
| 7 | 60.877 | 5.61 | 1.64769 | 33.8 |
| 8 | 200.005 | 0.30 | | |
| 9 | 30.742 | 5.30 | 1.62299 | 58.1 |
| 10 | ∞ | 0.30 | | |
| 11 | 14.646 | 6.56 | 1.48749 | 70.4 |
| 12 | −40.975 | 2.00 | 1.84666 | 23.8 |
| 13 | 13.167 | 6.30 | | |

TABLE 1-continued

| # | R | D | N | ν |
|---|---|---|---|---|
| 14 | ∞ (stop) | 40.16 | | |
| 15 | 45.545 | 9.98 | 1.63854 | 55.4 |
| 16 | 211.041 | 22.17 | | |
| 17 | 53.362 | 10.00 | 1.84666 | 23.8 |
| 18 | 189.512 | 7.50 | | |
| 19 | −51.975 | 2.50 | 1.71300 | 53.9 |
| 20 | 51.975 | 7.20 | 1.84666 | 23.8 |
| 21 | 164.587 | 15.39 | | |
| 22 | −34.388 | 3.00 | 1.84666 | 23.8 |
| 23 | −111.521 | 858.53 | | |
| 24 (Screen) | ∞ | | | |

COMPARATIVE EXAMPLE 1

Table 2 below lists the surface number #, starting with the DMD mirror surface and ending with the screen surface, the radius of curvature R (in mm) of each surface, the on-axis surface spacing D (in mm) between surfaces, as well as the index of refraction N and the Abbe number ν of each component at a wavelength 546.1 nm, of a prior art projection device.

TABLE 2

| # | R | D | N | ν |
|---|---|---|---|---|
| 1 (DMD) | ∞ | 3.00 | 1.51633 | 64.1 |
| 2 (DMD) | ∞ | 2.75 | | |
| 3 | ∞ | 23.00 | 1.51633 | 64.1 |
| 4 | ∞ | 10.41 | | |
| 5 | 46.671 | 5.87 | 1.71736 | 29.5 |
| 6 | −403.220 | 0.30 | | |
| 7 | 56.103 | 5.61 | 1.64769 | 33.8 |
| 8 | −875.665 | 0.30 | | |
| 9 | 36.599 | 5.30 | 1.62299 | 58.1 |
| 10 | ∞ | 0.30 | | |
| 11 | 14.009 | 6.56 | 1.48749 | 70.4 |
| 12 | −43.490 | 2.00 | 1.84666 | 23.8 |
| 13 | 12.960 | 6.30 | | |
| 14 | ∞ (stop) | 40.16 | | |
| 15 | 45.267 | 9.98 | 1.63854 | 55.4 |
| 16 | 201.908 | 22.17 | | |
| 17 | 53.161 | 10.00 | 1.84666 | 23.8 |
| 18 | 182.549 | 7.50 | | |
| 19 | −51.688 | 2.50 | 1.71300 | 53.9 |
| 20 | 51.688 | 7.20 | 1.84666 | 23.8 |
| 21 | 167.325 | 15.39 | | |
| 22 | −34.013 | 3.00 | 1.84666 | 23.8 |
| 23 | −107.320 | 858.13 | | |
| 24 (screen) | ∞ | | | |

Comparing Embodiment 1 of the present invention with Comparative Example 1, the surface of lens element L2 on the screen side (i.e., the surface of radius of curvature R8), is a gradual convex surface in Comparative Example 1, while it is a gradual concave surface in Embodiment 1 of the present invention. This difference changes the state of convergence of a beam of light as it is again reflected by the mirrors of the DMD 1, and thus makes the ghost light on the screen disperse over a wider area so as to not be troublesome.

The invention being thus described, it will be obvious that the same may be varied in many ways. For example the angles of rotation of the DMD elements between the On and Off orientations may be varied from that of Embodiment 1, as well as the radius of curvature of the lens element surfaces, the lens element spacings, the refractive indexes, and Abbe numbers. As another means for eliminating ghost light on the screen, it is possible to make an anti-reflective coating on the targeted lens surface that is causing undesired reflections back to the DMD array. In this case, if a green-colored ghost light is distinctive on the screen, it is desirable to make the anti-reflecting coating so as to prevent light reflection particularly in the green light wavelength region. Such variations are not to be regarded as a departure from the spirit and scope of the invention. Rather the scope of the invention shall be defined as set forth in the following claims and their legal equivalents. All such modifications as would be obvious to one skilled in the art are intended to be included within the scope of the following claims.

What is claimed is:

1. A projection device which uses light that is spatially modulated by a DMD having mirrors which are moveable between Off and On positions in response to image information input to the DMD, and which projects images formed at the DMD onto a screen via a projection lens, wherein the surfaces of the lens elements of the projection lens are designed with curvatures such that, when the following Condition (1) is satisfied, light that is undesirably reflected by one or more surfaces of the projection lens back to the DMD, where it is again reflected, is not in a converged state as it reflects the second time from mirror surfaces of the DMD:

$$\omega \leq |\theta_1| \leq 3\omega \qquad \text{Condition (1)}$$

where
  ω is one-half the angular amount that individual mirrors of the DMD are rotated between the Off and On orientations when modulating light from the light source with image information, and
  $\theta_1$ is an angle within the range of angles that the light rays which transit back to the DMD, after being undesirably reflected by a lens element surface of the projection lens, make with the optical axis X of the DMD.

2. The projection device according to claim 1, wherein the one or more surfaces of the projection lens which undesirably reflect light back to the DMD includes a screen-side surface of a lens element.

3. The projection device according to claim 2, said projection lens having a stop, and wherein the one or more surfaces of the projection lens which undesirably reflects light back to the DMD are located on the DMD side of said stop.

4. The projection device according to claim 1, said projection lens having a stop, and wherein the one or more surfaces of the projection lens which undesirably reflects light back to the DMD are located on the DMD side of said stop.

5. A projection device which uses light that is spatially modulated by a DMD having mirrors which are moveable between Off and On positions in response to image information input to the DMD, and which projects images formed at the DMD onto a screen via a projection lens, wherein the surfaces of the lens elements of the projection lens are designed with curvatures such that, when the following Condition (1) is satisfied, light that is undesirably reflected by one or more surfaces of the projection lens back to the DMD, where it is again reflected, is not in a converged state at or within the surfaces of the DMD:

$$\omega \leq |\theta_1| \leq 3\omega \qquad \text{Condition (1)}$$

where
  ω is one-half the angular amount that individual mirrors of the DMD are rotated between the Off and On orientations when modulating light from the light source with image information, and $\theta_1$ is an angle within the range of angles that the light rays which transit back to the DMD, after being undesirably reflected by a lens element surface of the projection lens, make with the optical axis X of the DMD.

6. The projection device according to claim 5, wherein the one or more surfaces of the projection lens which undesirably reflects light back to the DMD includes a surface of the projection lens that is concave on the screen side of a lens element.

7. The projection device according to claim 6, said projection lens having a stop, and wherein the one or more surfaces of the projection lens which undesirably reflects light back to the DMD are located on the DMD side of said stop.

8. The projection device according to claim 5, said projection lens having a stop, and wherein the one or more surfaces of the projection lens which undesirably reflects light back to the DMD are located on the DMD side of said stop.

9. A projection device which uses light that is spatially modulated by a DMD having mirrors which are moveable between Off and On positions in response to image information input to the DMD, and which projects images formed at the DMD onto a screen via a projection lens, wherein the surfaces of the lens elements of the projection lens are designed with curvatures such that, when the following Condition (1) is satisfied, light that is undesirably reflected by one or more surfaces of the projection lens back to the DMD, where it is again reflected, is not in a converged state in a region from the micro-mirror surfaces to, and including, the screen-side surface of a prism used to input light into the DMD, as the light reflects the second time from mirror surfaces of the DMD:

$$\omega \leq |\theta_1| \leq 3\omega \qquad \text{Condition (1)}$$

where $\omega$ is one-half the angular amount that individual mirrors of the DMD are rotated between the Off and On orientations when modulating light from the light source with image information, and $\theta_1$ is an angle within the range of angles that the light rays which transit back to the DMD, after being undesirably reflected by a lens element surface of the projection lens, make with the optical axis X of the DMD.

* * * * *